United States Patent [19]
Kashiwabara et al.

[11] Patent Number: 5,790,968
[45] Date of Patent: Aug. 4, 1998

[54] CONTROL SYSTEM AND METHOD FOR VEHICLE WITH CONTINUOUSLY VARIABLE TRANSMISSION

[75] Inventors: Masuo Kashiwabara; Masayuki Hosono; Hiroyuki Yuasa, all of Kanagawa-ken, Japan

[73] Assignee: Unisia Jecs Corporation, Atsugi, Japan

[21] Appl. No.: 525,745

[22] PCT Filed: Feb. 28, 1995

[86] PCT No.: PCT/JP95/00308

§ 371 Date: Oct. 2, 1995

§ 102(e) Date: Oct. 2, 1995

[87] PCT Pub. No.: WO95/23302

PCT Pub. Date: Aug. 31, 1995

[30] Foreign Application Priority Data

Feb. 28, 1994 [JP] Japan .................... 6-029843

[51] Int. Cl.$^6$ .................... F16H 61/04; B60K 41/12
[52] U.S. Cl. .................... 701/51; 701/55; 701/56; 701/61; 477/43; 477/46; 477/49
[58] Field of Search .................... 364/424.08, 424.083, 364/424.084, 424.085, 424.09, 424.093; 477/49, 46, 43, 68, 117, 115

[56] References Cited

U.S. PATENT DOCUMENTS

| | | | |
|---|---|---|---|
| 4,827,803 | 5/1989 | Miyawaki | 364/424.09 |
| 4,833,944 | 5/1989 | Tanaka | 477/43 |
| 5,009,127 | 4/1991 | Morimoto et al. | 364/424.09 |
| 5,009,129 | 4/1991 | Morimoto et al. | 477/49 |
| 5,020,392 | 6/1991 | Morimoto | 477/98 |
| 5,156,572 | 10/1992 | Morishige | 474/70 |
| 5,382,205 | 1/1995 | Togai et al. | 477/43 |

FOREIGN PATENT DOCUMENTS

| | | |
|---|---|---|
| 0 364 269 | 4/1980 | European Pat. Off. . |
| 0 228 897 | 7/1987 | European Pat. Off. . |
| 0 240 285 | 10/1987 | European Pat. Off. . |
| 33 07 629 | 8/1984 | Germany . |
| 59-70849 | 4/1984 | Japan . |
| 62-149526 | 7/1987 | Japan . |
| 63-61653 | 3/1988 | Japan . |
| 63-71437 | 3/1988 | Japan . |

OTHER PUBLICATIONS

Eggert, U. "CVT-Gatriebe: Elektronische Regalung und Fahrdynamlk", VDI Zeitschrift-Special Antriebstechnlk, No. 1, Duesseldorf, .Mar. 1992, pp. 26–49.

*Primary Examiner*—Tan Q. Nguyen
*Attorney, Agent, or Firm*—Foley & Lardner

[57] ABSTRACT

A steady state transmission ratio Base i is computed from a vehicle speed VPS and a throttle opening TVO (S1). An output shaft revolution speed No of the transmission and a current transmission ratio i are detected (S2, S3). A coefficient TTINR is computed from a difference or a ratio or the like between the steady state transmission ratio Base i and the current transmission ratio i (S4). Then, from the current transmission ratio i, the output shaft revolution speed No and the coefficient TTINR, a shift speed $SV=TTINR/(I_E \times i \times No)$ is computed (S5). Then a shift control is performed in accordance with the shift speed SV so as to approach to the steady state transmission ratio Base i (S6–S9). Thus, the shift speed during shifting in a continuously variable transmission is controlled in consideration of inertia torque.

32 Claims, 10 Drawing Sheets

Fig.10

CONTROL SYSTEM AND METHOD FOR VEHICLE WITH CONTINUOUSLY VARIABLE TRANSMISSION

TECHNICAL FIELD

The present invention relates to control system and method for a vehicle having a continuously variable transmission between an engine and a continuosly variable drive axle.

BACKGROUND ART

In the case of a transmission (CVT), there are hitherto known the following problems that arise during shifting at a high shift speed.

(1) Because of the occurrence of a negative inertia torque, there arise a feeling of speed decrease (hesitation) during downshift, and a feeling of dashing out during upshift.

(2) In downshift, the engine revolution increases prior to an increase of the vehicle speed, resulting in an unnatural feeling characteristic of CVT.

By contrast to this, a system disclosed in an official gazette of Japanese Patent Provisional (Unexamined) Publication No. 62-149526, for example, is arranged to determine the shift speed from a deviation between a steady state transmission ratio as a final target and a current transmission ratio, and a correction quantity determined by a throttle opening speed.

However, the system of the above-mentioned official gazette seems insufficient to solve the problem mentioned in (1) above, for the following reason.

An inertia torque $T_I$ during shifting is determined by the following equations, assuming that an engine inertia $I_E$ is predominant:

$$T_I = I_E \cdot d\omega_E/dt \cdot i$$

$$\omega_E = 2\pi N_E/60$$

where $i$ is a transmission ratio, $\omega_E$ is an angular speed of the engine, and $N_E$ is a revolution speed or a number of revolutions of the engine (a transmission's input shaft revolution speed).

Supposing $dN_O/dt \ll dN_E/dt$ during a shift operation, the following equation is obtained from $N_E = i \cdot N_O$:

$$T_I = I_E \cdot di/dt \cdot i \cdot N_O \tag{1}$$

where $T_I$ is the inertia torque, $I_E$ is the engine inertia (fixed value), $di/dt$ is the shift speed, $i$ is the transmission ratio, and $N_O$ is a transmission's output shaft revolution speed.

Therefore, in order to control the shift speed in consideration of the inertia torque, the transmission's output shaft revolution speed $N_O$ (namely the vehicle speed) must be taken into account.

Figure 10:
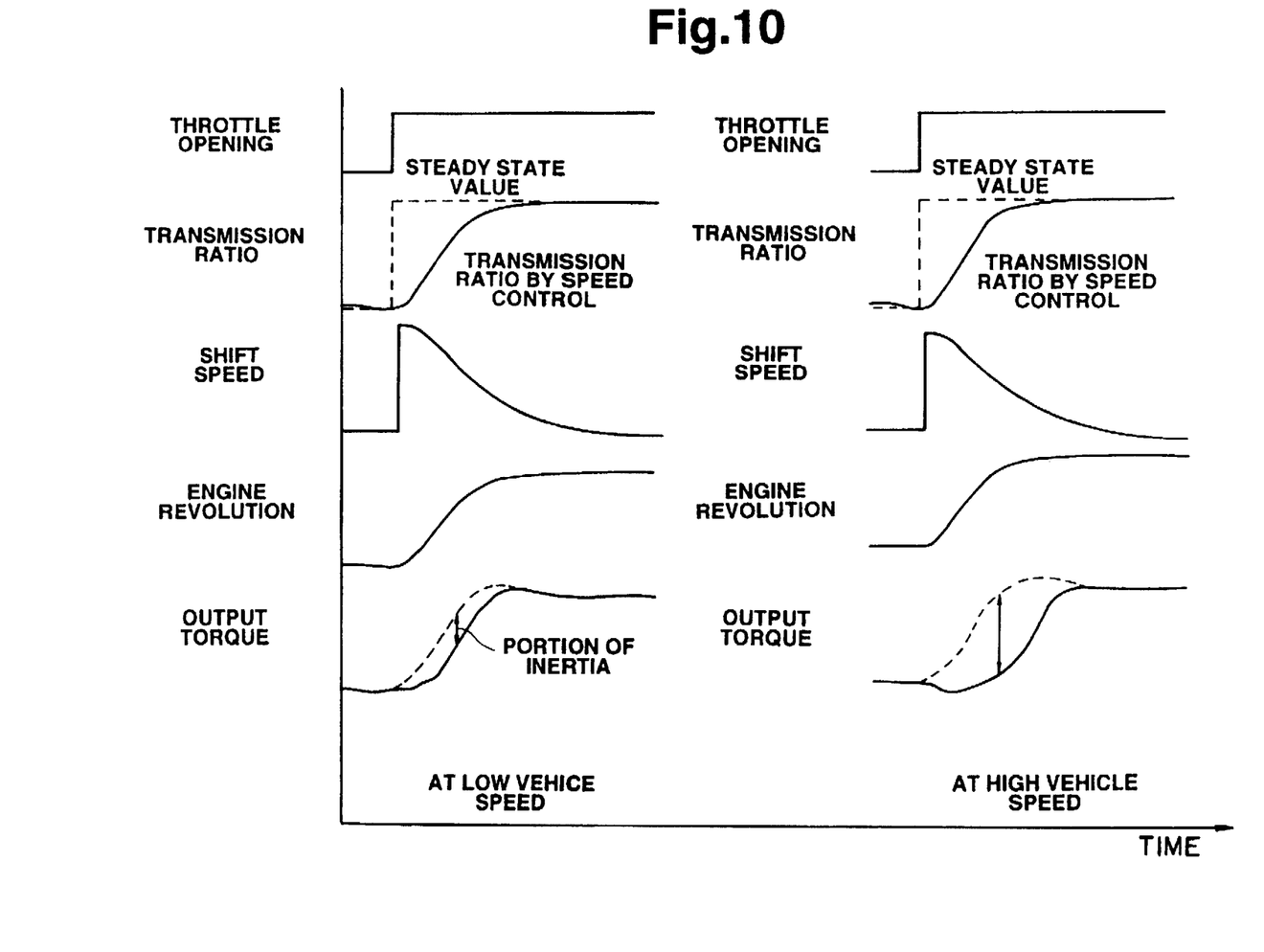
FIG. 10 is a view showing characteristics of a conventional example.

As shown by characteristics at low and high vehicle speeds in FIG. 10, the inertia torque differs between the low vehicle speed operation and high vehicle speed operation, even if the width of the transmission ratio is the same. The system disclosed in the above-mentioned official gazette controls with the same shift speed nevertheless. Specifically in the high vehicle speed operation, therefore, the output torque is diminished by an increase of the engine revolution speed. This system suffers such a disadvantage.

As to the problem mentioned in (2), the system recited in the above-mentioned official gazette is arranged to modify the shift speed earlier when a driver's intention of rapid acceleration is ascertained by the throttle opening speed.

However, the use of the throttle opening may cause a feeling of rapid increase of the engine revolution specifically on the high opening side because the relation between the driving force and the throttle opening is not linear, and accordingly an intention of acceleration and an actual acceleration do not coincide.

SUMMARY OF THE INVENTION

In view of the problems mentioned above, one of the objects of the present invention is to control an inertia torque during shifting to a desired value in a vehicle equipped with a continuously variable transmission, and to improve the drivability by controlling the shift speed in consideration of a driver's intention. A more concrete object of the present invention is to provide vehicle control system and method that can control the inertia torque to the desired value and better reflect the driver's intention reflected, by determining the shift speed as a decreasing function with respect to the current transmission ratio $i$ and the output shaft revolution speed $N_O$, and as an increasing function with respect to said coefficient TTINR.

It is another object of the present invention to provide vehicle control system and method that can take account of a step in the transmission ratio by computing the coefficient TTINR based on a relationship between the current transmission ratio and a transmission ratio in a steady state condition.

It is still another object of the present invention to provide vehicle control system and method that can take account of a step of an output (horsepower) and provide a characteristic corresponding to a vehicle behavior by computing the coefficient TTINR based on a relationship between a current output (horsepower) and an output (horsepower) in a steady state condition.

It is still another object of the present invention to provide vehicle control system and method that can take account of a step of a driving force of a vehicle and provide a characteristic corresponding to a vehicle behavior by computing the coefficient TTINR based on a relationship between a current driving force of the vehicle and a driving force of the vehicle in a steady state condition.

It is still another object of the present invention to provide vehicle control system and method which facilitates the computing process by employing, as the above-mentioned relationship, a difference between the value in the steady state condition and the current value, and which enables a more intrinsic correction by employing, as the above-mentioned relationship, a ratio between the steady state value and the current value.

It is still another object of the present invention to provide vehicle control system and method that can reflect an intention of acceleration by computing the coefficient TTINR by using a rate of change of a steady state transmission ratio, a rate of change of the steady state output (horsepower), or a rate of change of the steady state vehicle driving force.

It is still another object of the present invention to provide vehicle control system and method that can reflect an intention of acceleration by computing the coefficient TTINR by using a rate of change of the throttle opening degree.

Figure 1:
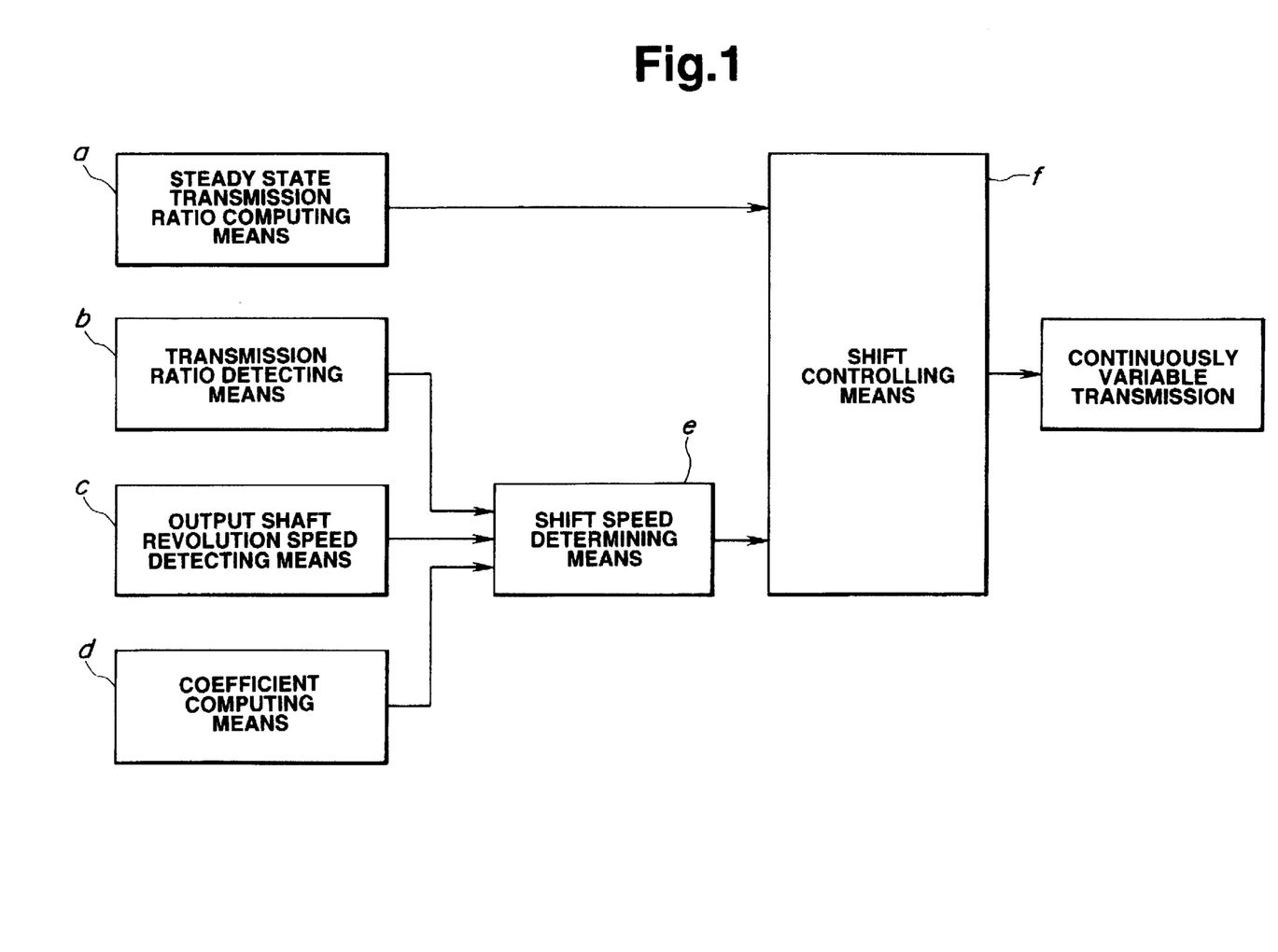
FIG. 1 is a functional block diagram illustrating an arrangement according to the present invention.

These and other objects of the invention are achieved by providing a control system or apparatus for a vehicle equipped with a continuously variable transmission is constructed, as shown in FIG. 1, by providing a steady state transmission ratio computing means a for determining a transmission ratio in a steady state condition in accordance with an operating condition of the vehicle; a transmission ratio detecting means b for detecting a current transmission ratio; an output shaft revolution speed detecting means c for detecting a number of revolutions of an output shaft of the transmission; a coefficient computing means d for computing a coefficient determined by an operating condition of the vehicle; a shift speed determining means e for determining a shift speed in shifting in accordance with at least the current transmission ratio, the number of revolutions of the output shaft, and the coefficient; and a shift controlling means f for controlling a shift element of the transmission in accordance with the shift speed so as to approach to the steady state transmission ratio.

The shift speed determined by the shift speed determining means e may be a decreasing function (monotone nonincreasing function) with respect to the current transmission ratio and the number of revolutions of the output shaft, and an increasing function (monotone nondecreasing function) with respect to the coefficient.

Therefore, this control system can perform the shift control in consideration of the inertia torque by determining the shift speed in accordance with the current transmission ratio i, the number of revolutions of the transmission output shaft No, and the coefficient TTINR determined by the vehicle operating condition, more specifically in the form of a decreasing function (monotone nonincreasing function) with respect to the current transmission ratio i and the number of revolutions of the output shaft No, and in the form of an increasing function (monotone nondecreasing function) with respect to the above-mentioned coefficient TTINR.

The reason for this is that, from the equation (1), the shift speed is; $di/dt = TTINR/(I_E \cdot N \cdot i)$.

Moreover, the above-mentioned coefficient computing means d can take account of a step difference in the transmission ratio by computing the coefficient TTINR in accordance with a relationship between the current transmission ratio and the steady state transmission ratio.

The said coefficient computing means d can take account of a step difference in the output (horsepower) and provide a characteristic corresponding to a vehicle behavior by having a current output power computing means for computing a current output (horsepower) in accordance with a vehicle operating condition, and a steady state output computing means for computing a steady state output (horsepower) in accordance with a vehicle operating condition, and said steady state transmission ratio, and by computing the coefficient TTINR in accordance with a relationship between the current output and the steady state output.

The coefficient computing means d can further take account of a step in the vehicle driving force and provide a characteristic corresponding to a vehicle behavior by having a current driving force computing means for computing a current driving force of the vehicle in accordance with a vehicle operating condition, and a steady state driving force computing means for computing a steady state driving force of the vehicle in accordance with a vehicle operating condition, and the steady state transmission ratio, and by computing the coefficient TTINR in accordance with a relationship between the current vehicle driving force and the steady state vehicle driving force.

When the the relationship in the coefficient computing means d is the difference between the steady state value and the current value, the computing process can be made easier.

When the the relationship in the coefficient computing means d is the ratio between the steady state value and the current value, a more intrinsic correction is possible because, between the shift of the transmission ratio 1.0→2.0 and the shift of the transmission ratio 2.0→3.0, for example, the use of the ratio can provide different controls whereas the use of the difference results in the same control.

By computing the coefficient TTINR on the basis of the rate of change of the steady state transmission ratio, the said coefficient computing means d can reflect an intention of acceleration in the form of the rate of change.

The coefficient computing means d can also reflect the accelerating intention by having a steady state output power computing means for computing a steady state output (horsepower) in accordance with a vehicle operating condition and the steady state transmission ratio, and by computing the coefficient TTINR in accordance with the rate of change of the steady state output (horsepower).

The coefficient computing means d can also reflect the accelerating intention by having a steady state driving force computing means for computing a steady state vehicle driving force in accordance with a vehicle operating condition and the steady state transmission ratio, and by computing the coefficient TTINR in accordance with the rate of change of the steady state vehicle driving force.

Furthermore, the coefficient computing means d can reflect the accelerating intention by computing the coefficient TTINR in accordance with the rate of change of the throttle opening degree.

DETAILED DESCRIPTION OF THE PREFERRED EMBODIMENTS

An embodiment of the present invention will be explained with reference to the attached drawings.

Figure 2:
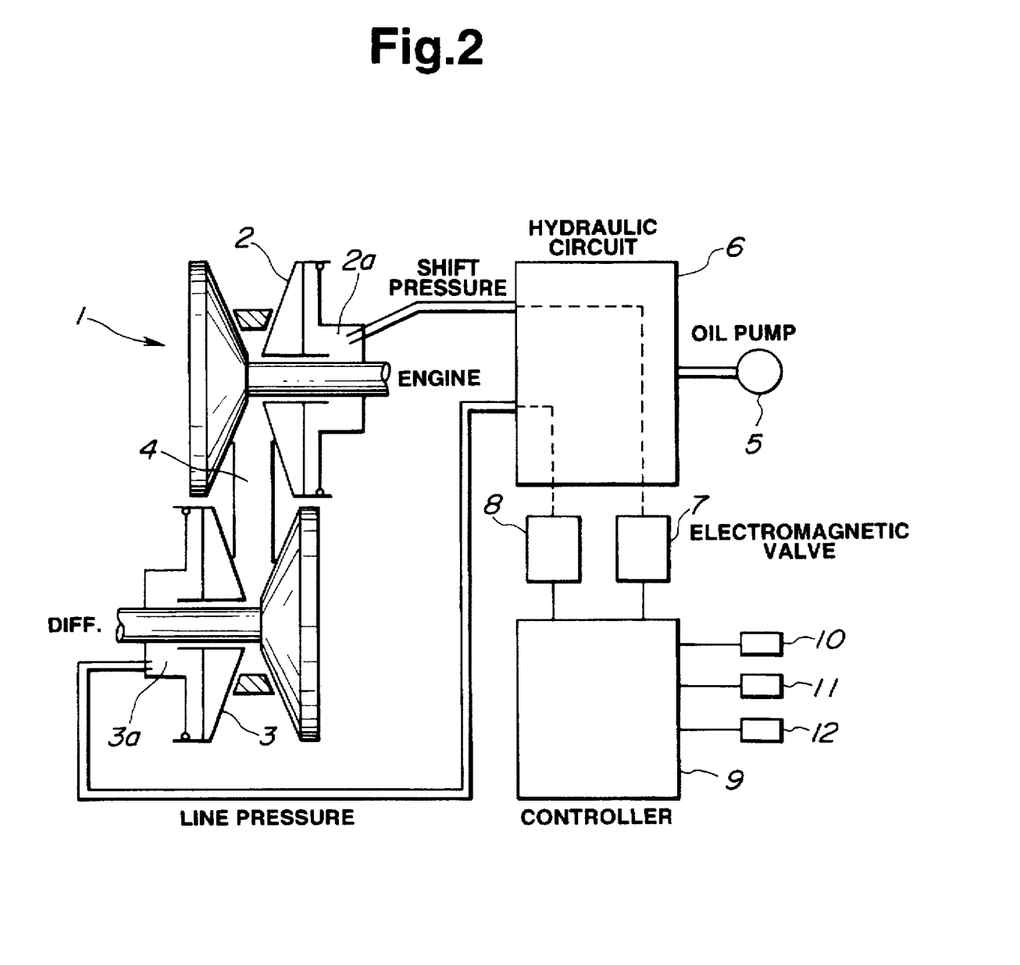
FIG. 2 is a system view showing one embodiment of the present invention.

FIG. 2 is a system view showing one embodiment of the present invention.

A continuously variable transmission (CVT) 1 has a primary pulley 2 on an engine's side, a secondary pulley 3 on a drive axle's (differential's) side, and a belt 4 connecting these pulleys. This transmission can vary the transmission ratio in a stepless manner by varying a pulley ratio by regulation of a shift pressure to an actuator 2a on a primary pulley's side and a line pressure to an actuator 3a on a secondary pulley's side. It is optional to employ a CVT of another type, such as a toroidal type CVT.

The shift pressure and line pressure are regulated by controlling an oil pressure of a hydraulic circuit 6 connected to an oil pump 5, with electromagnetic valves 7 and 8 having a relief function. A controller 9 controls the electromagnetic valves 7 and 8.

Therefore, the controller 9 can control the transmission ratio by controlling the shift pressure and line pressure with the electromagnetic valves 7 and 8.

For the transmission ratio control, the controller 9 receives 10 sensor signals from a vehicle speed sensor 10 for sensing a vehicle speed VSP, a throttle sensor 11 for sensing a throttle opening degree TVO, and an engine revolution sensor 12 for sensing an engine revolution speed NE.

The controller 9 performs a shift control by setting the transmission ratio in accordance with these sensor signals by means of a microcomputer the controller 9 has therein, and controlling the electromagnetic valves 7 and 8 so as to attain the determined transmission ratio.

Figure 3:
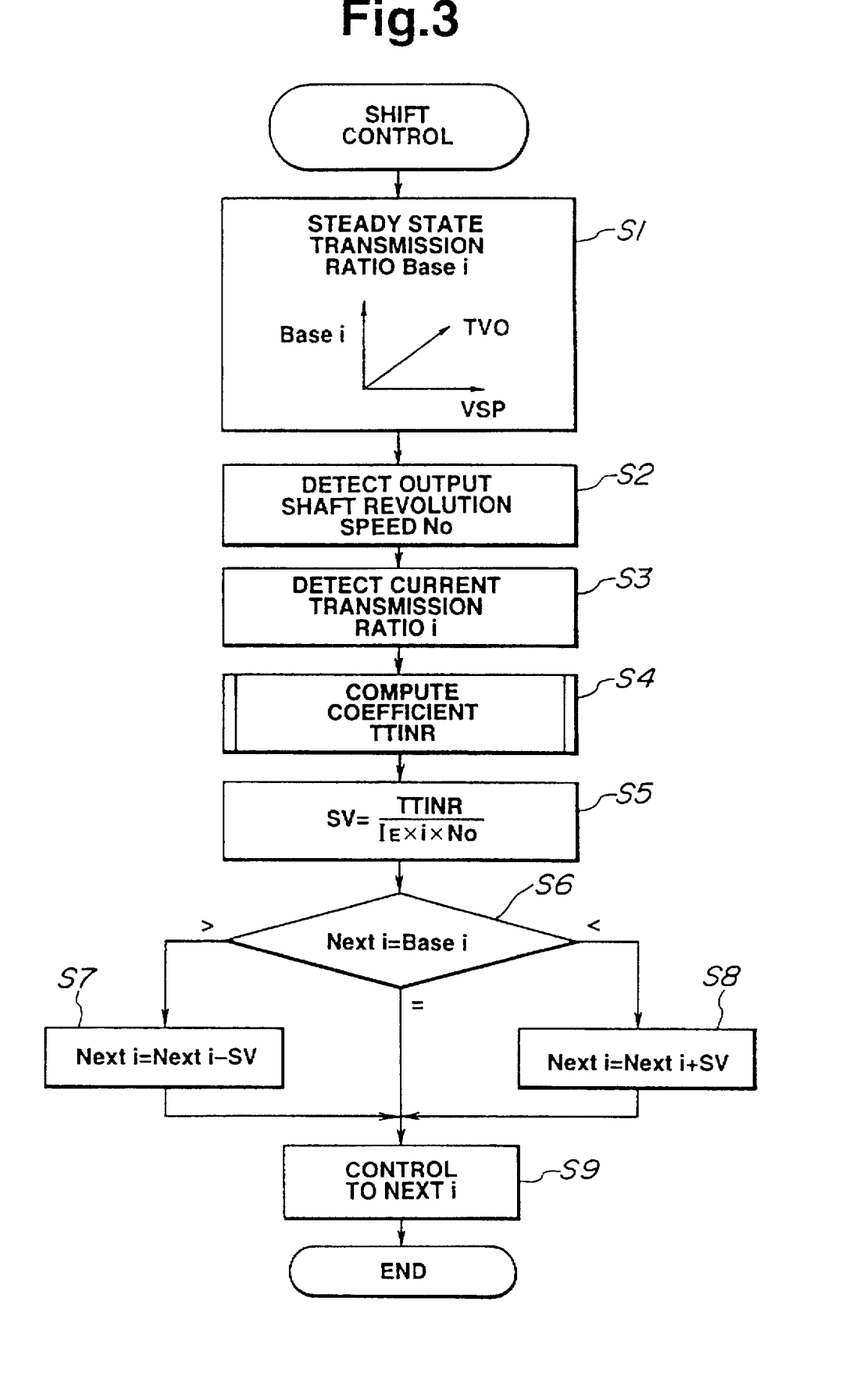
FIG. 3 is a flow chart showing a shift control routine.

FIG. 3 is a flow chart showing a shift control routine, which is performed at every predetermined unit time interval.

At a step 1 (denoted as S1 in the figure. The same notation shall apply to the subsequent steps hereinafter.), the controller consults a map for determining a steady state transmission ratio (final target transmission ratio) as a final target in accordance with the vehicle speed VSP and the throttle opening degree TVO, and reads in the steady state transmission ratio (final target ratio) Base i from the actual VSP and TVO. This section corresponds to a steady state transmission ratio computing means.

At a step 2, a revolution speed No of an output shaft of the transmission is detected. This detection can be done by the vehicle speed sensor. This section corresponds to an output shaft revolution speed detecting means.

At a step 3, a current transmission ratio i is detected. The transmission ratio i can be determined, from the engine revolution speed (the revolution speed of the input shaft of the transmission) NE and the output shaft revolution speed No of the transmission, as a ratio (NE/No) of these speeds. Therefore, the current transmission ratio i is computed from these speeds. This section corresponds to a transmission ratio detecting means.

At a step 4, the controller computes a coefficient TTINR (an abbreviation for target inertia torque) determined by an operating condition. This section corresponds to a coefficient computing means.

Figure 4:
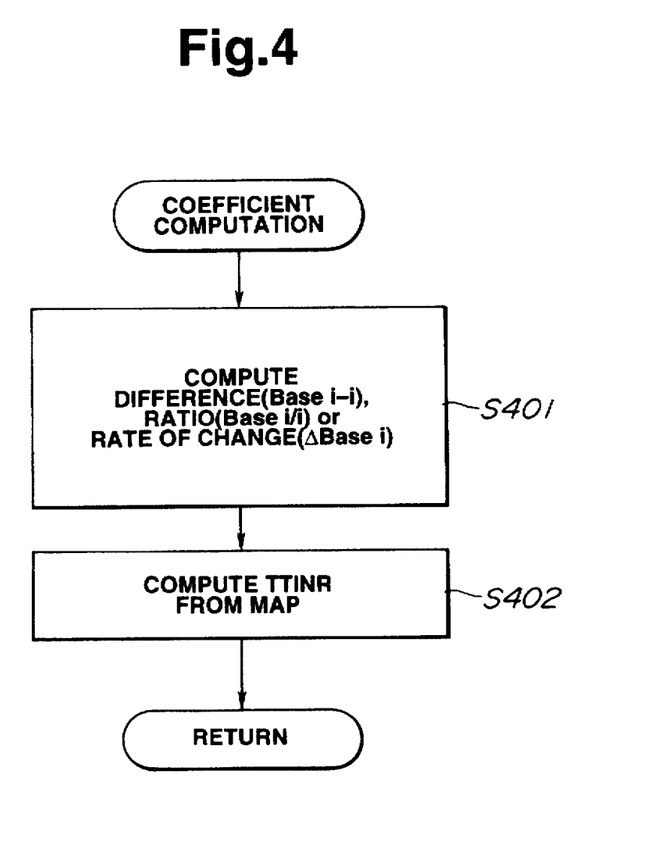
FIG. 4 is a flow chart of a coefficient computing subroutine (1).
Figure 5:
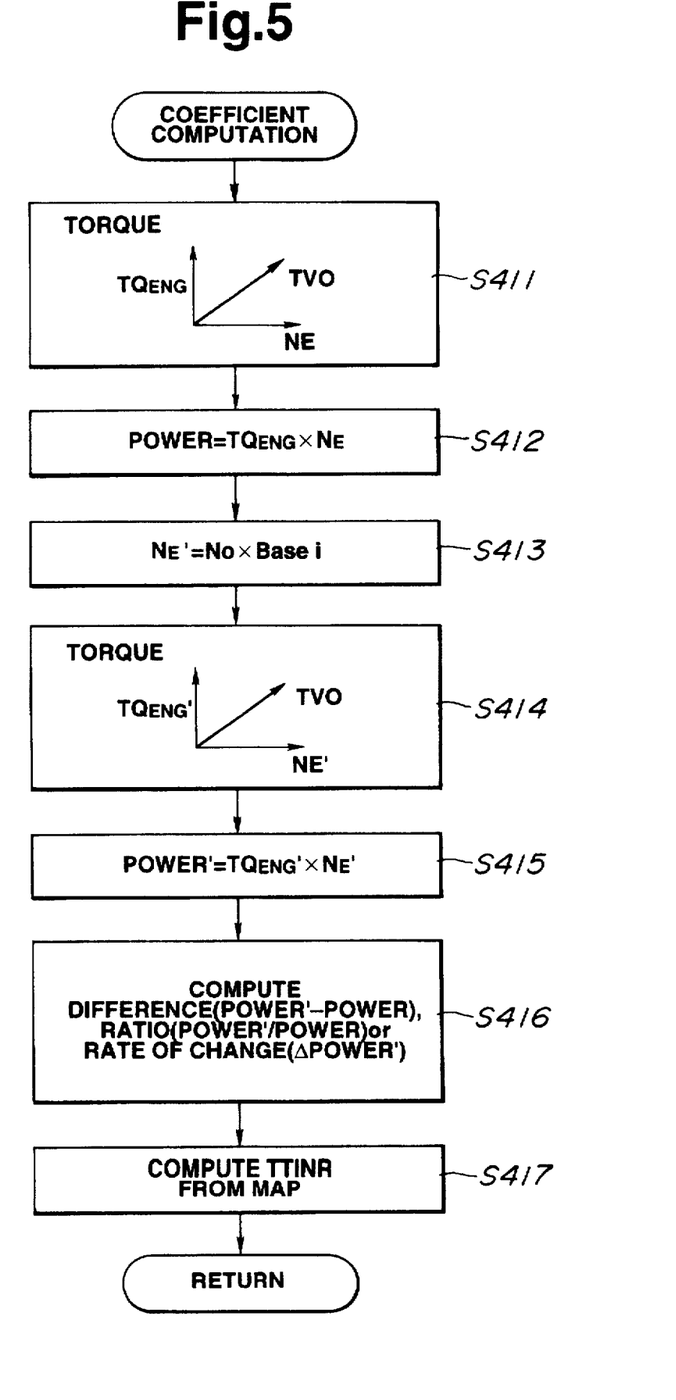
FIG. 5 is a flow chart of a coefficient computing subroutine (2).
Figure 6:
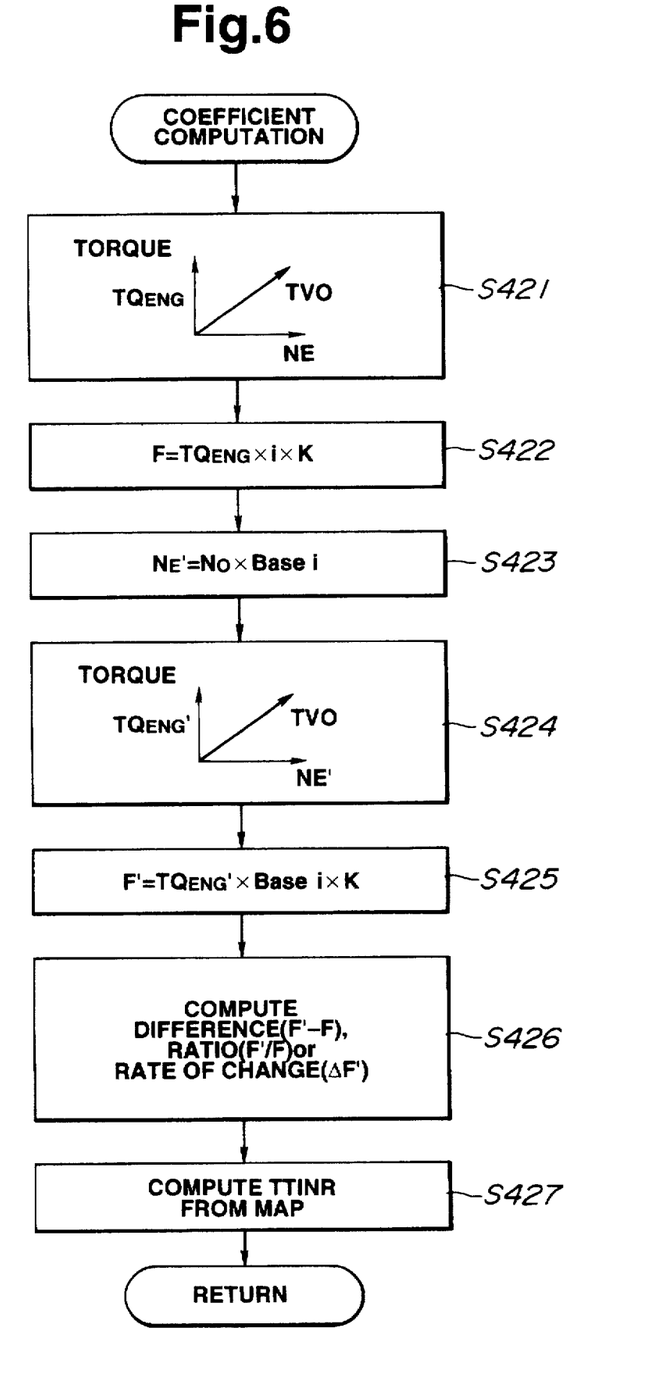
FIG. 6 is a flow chart of a coefficient computing subroutine (3).

The coefficient is computed according to one of computing methods shown in FIGS. 4–6.

In the method of FIG. 4, first at a step 401, the controller computes (the absolute value of) a difference |Base i–i| of the steady state transmission ratio Base i and the current transmission ratio i, or the ratio Base i/i (or i/Base i), or a rate of change ΔBase i of the steady state transmission ratio Base i (which is the absolute value of an amount of change per unit time, and which is the absolute value of a difference from the value computed in the previous execution of the routine). When the ratio is employed, it is optional to use the ratio i/Base i in upshift, and the ratio Base i/i in downshift.

Figure 7A:
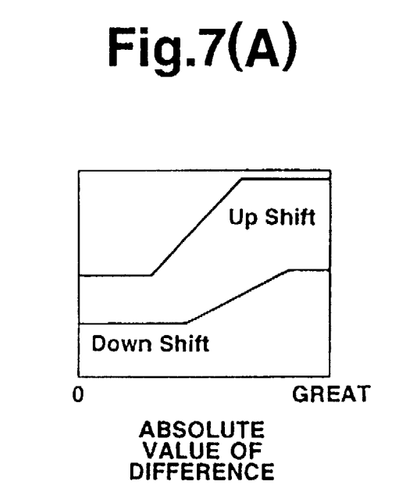
FIGS. 7(A), 7(B), and 7(C) are views showing a map for coefficient computation.
Figure 7B:
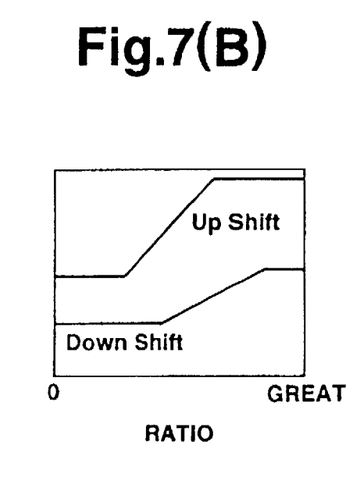
Figure 7C:
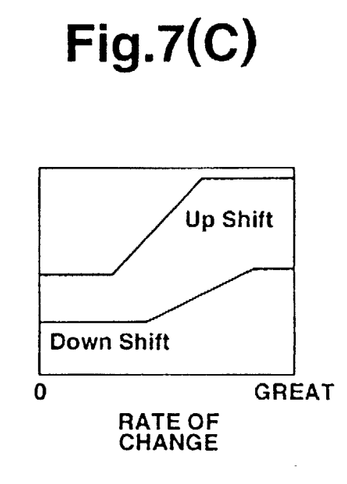

At a step 402, the controller determines the coefficient TTINR by consulting a map of FIG. 7(A) in the case of the difference, or a map of FIG. 7(B) in the case of the ratio, or a map of FIG. 7(C) in the case of the rate of change. In the maps, characteristics in upshift and downshift are differentiated from each other.

In the method of FIG. 5, the controller first computes an engine torque TQENG from the engine revolution speed NE and the throttle opening degree TVO by consulting a map at a step 411, and then determines a current horse power POWER=TQENG×NE from the engine torque TQENG and the engine revolution speed NE, at a step 412. This section corresponds to a current output power computing means.

Then, at a step 413, from the transmission's output shaft revolution speed No and the steady state transmission ratio Base i, the controller computes a steady state engine revolution speed NE'=No×Base i. Then, at a step 414, from the steady state engine revolution speed NE' and the throttle opening degree TVO, the controller computes a steady state engine torque TQENG' by consulting the map (used in the step 411). At a step 415, from the steady state engine torque TQENG' and the steady state engine revolution speed NE', the controller computes a steady state horse power POWER'=TQENG'×NE'. This section corresponds to a steady state output power computing means.

Then, at a step 416, the controller computes (the absolute value of) a difference |POWER'–POWER| between the steady state horse power POWER' and the current horse power POWER, or a ratio POWER'/POWER (or POWER/POWER'), or a rate of change ΔPOWER' of the steady state horse power POWER' (that is the absolute value of an amount of change per unit time, and that is the absolute value of a difference from the computed value in the previous execution of the routine).

Then, at a step 417, the controller determines the coefficient TTINR by consulting the map of FIG. 7(A) in the case of the difference, or the map of FIG. 7(B) in the case of the ratio, or the map of FIG. 7(C) in the case of the rate of change.

In the method of FIG. 6, the controller first computes the engine torque TQENG from the engine revolution speed NE and the throttle opening degree TVO by consulting the map at a step 421. Then, at a step 422, from the engine torque TQENG, the current transmission ratio i and a predetermined constant K (a constant including a tire radius, a differential characteristic), the controller determines a current vehicle driving force F=TQENG×i×K. This section corresponds to a current driving force computing means.

Then, at a step 423, from the transmission's output shaft revolution speed No and the steady state transmission ratio Base i, the controller computes the steady state engine revolution speed NE'=No×Base i. Then, at a step 424, from the steady state engine revolution speed NE' and the throttle opening degree TVO, the controller computes the steady state engine torque TQENG' by consulting the map (used in the step 421). Then at a step 425, from the steady state engine torque TQENG', the steady state transmission ratio Base i, and the predetermined constant K, the controller computes a steady state vehicle driving force F'=TQENG'×Base i×K. This section corresponds to a steady state driving force computing means.

Then, at a step 426, the controller computes (the absolute value of) a difference |F'–F| between the steady state vehicle driving force F' and the current vehicle driving force F, or a ratio F'/F (or F/F'), or a rate of change ΔF' of the steady state vehicle driving force F' (that is the absolute value of an amount of change per unit time, and that is the absolute value of a difference from the computed value in the previous execution of the routine).

Then, at a step 427, the controller determines the coefficient TTINR by consulting the map of FIG. 7(A) in the case of the difference, or the map of FIG. 7(B) in the case of the ratio, or the map of FIG. 7(C) in the case of the rate of change.

The description now reverts to FIG. 3.

At a step 5, from the current transmission ratio i, the transmission's output shaft revolution speed No, and the previous coefficient TTINR, the controller determines an amount SV of increase or decrease determining the shift speed, according to the following equation. This section corresponds to a shift speed determining means.

$$SV=TTINR/(I_E \times i \times No)$$

where IE is a constant corresponding to an engine inertia.

At a step 6, the controller compares a currently set transmission ratio (target transmission ratio) Next i and the steady state transmission ratio Base i that is the final target, to determine which is greater.

When Next i>Base i, it is a request for upshift (a request for decreasing the transmission ratio), and accordingly the controller proceeds to a step 7.

At the step 7, the controller decreases the set transmission ratio (target transmission ratio) Next i by the above-mentioned increase or decrease amount SV with respect to the current value (cf. the next equation).

$$Next\ i = Next\ i - SV$$

When Next i<Base i, it is a request for downshift (a request for increasing the transmission ratio), and accordingly, the controller proceeds to a step 8.

At the step 8, the controller increases the set transmission ratio (target transmission ratio) Next i by the above-mentioned increase or decrease amount SV with respect to the current value (cf. the next equation).

$$Next\ i = Next\ i + SV$$

After thus determining the set transmission ratio (target transmission ratio) Next i, the controller proceeds to a step S9.

At the step 9, the controller performs a feedback control so as to attain the set transmission ratio (target transmission ratio) Next i. Namely, the transmission ratio control is performed to bring the current transmission ratio 1 detected as the ratio (NE/No) between the engine revolution speed NE and the transmission output shaft revolution speed No, closer to the set transmission ratio Next i.

Therefore, the section of the steps 6–9 corresponds to a shift controlling means.

Figure 8:
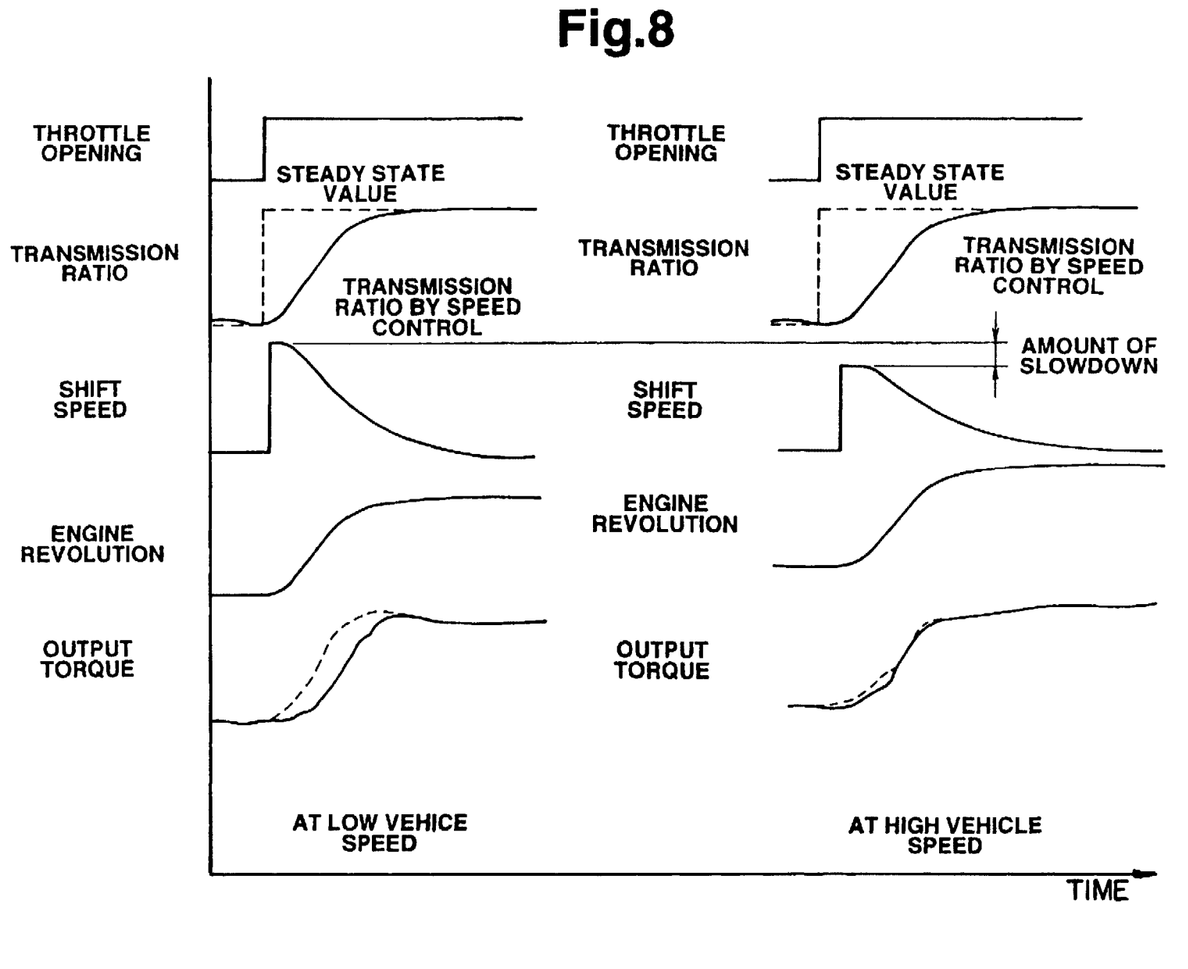
FIG. 8 is view showing characteristics according to the present invention.

As a result of the thus-arranged control, as shown in FIG. 8 illustrating characteristics at low vehicle speeds and at high vehicle speeds, the shift speed varies between the low vehicle speed operation and the high vehicle speed operation despite the width of the transmission ratio being the same. Specifically, the shift speed becomes gradual in the high vehicle speed operation, and therefore the inertia torque becomes approximately constant. Thus, this control system can avoid a decrease in the output torque as in the conventional example shown in FIG. 10.

Figure 9:
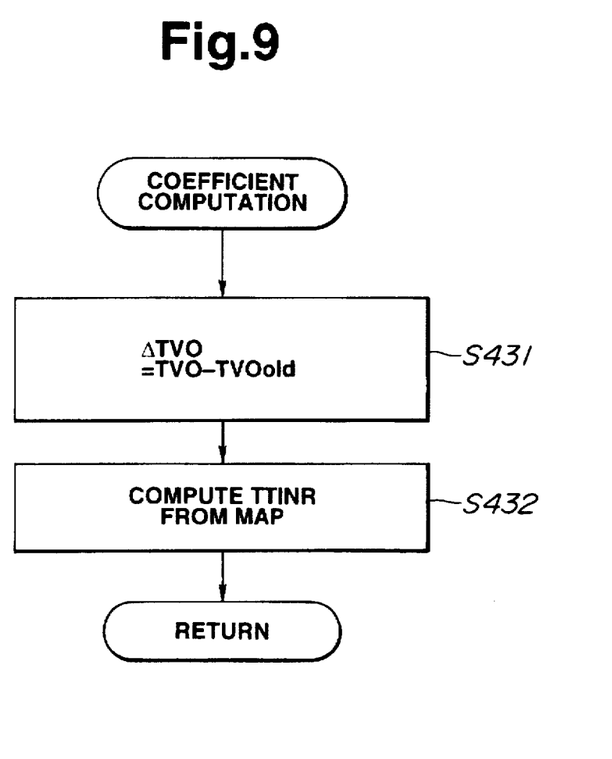
FIG. 9 is a flow chart of a coefficient computing subroutine (4).

FIG. 9 shows another example of the method for computing the above-mentioned coefficient TTINR.

At a step 431, the controller computes a rate of change ΔTVO of the throttle opening degree (the absolute value of an amount of change per unit time, or the absolute value of a difference between the detected value TVO of the current routine, and the detected value TVOold of the entire or previous routine).

Then, at a step 432, the controller determines the coefficient TTINR from the rate of change of the throttle opening degree ΔTVO by consulting a map corresponding to FIG. 7(C).

The use of the coefficient TTINR corresponding to the thus-determined rate of change of the throttle opening degree ΔTVO too can reflect an intention of acceleration.

In addition to the above-mentioned methods for computing the coefficient TTINR, it is optional to employ a method for directly determining the coefficient from the horse power POWER, the vehicle driving force F, the engine revolution speed NE, the throttle opening degree TVO, the intake air flow rate Q, or a base fuel injection quantity (corresponding to Q/NE).

As explained above, according to the present invention, the control system and method for a vehicle equipped with a continuously variable transmission are applicable not only to the above-mentioned continuously variable transmission for varying the transmission ratio in the stepless manner by varying the pulley ratio with regulation of the shift pressure supplied to the primary pulley's side actuator and the line pressure supplied to the secondary pulley's side actuator, but also to any other continuously variable transmission such as a toroidal type transmission.

Other embodiments of the invention will be apparent to those skilled in the art from consideration of the specification and practice of the invention disclosed herein. It is intended that the specification be considered as exemplary only, with the true scope and spirit of the invention being indicated by the following claims.

We claim:

1. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein the shift speed determining means is connected with the transmission ratio detecting means, the output shaft revolution speed detecting means and the coefficient computing means, and receives a signal representing the current transmission ratio from the transmission ratio detecting means, a signal representing the output shaft revolution speed from the output shaft revolution speed detecting means, and a signal representing the coefficient from the coefficient computing means.

2. A control system for the vehicle with the continuously variable transmission as recited in claim 1 wherein the shift speed determined in said shift speed determining means is a decreasing function with respect to said current transmission ratio and said output shaft revolution speed, and an increasing function with respect to said coefficient.

3. A control system for the vehicle with the continuously variable transmission as recited in claim 2 wherein said coefficient computing means is a means for computing said coefficient in accordance with a relationship between said current transmission ratio and said steady state transmission ratio.

4. A control system for the vehicle with the continuously variable transmission as recited in claim 2 wherein said coefficient computing means is a means for computing said coefficient in accordance with a rate of change of said steady state transmission ratio.

5. A control system for the vehicle with the continuously variable transmission as recited in claim 2 wherein said coefficient computing means is a means for computing said a coefficient in accordance with a rate of change of a throttle opening degree.

6. A control system for the vehicle with the continuously variable transmission as recited in claim 1 wherein said coefficient computing means is a means for computing said coefficient in accordance with a relationship between said current transmission ratio and said steady state transmission ratio.

7. A control system as recited in claim 1 wherein said coefficient computing means is a means for computing said coefficient in accordance with a rate of change of said steady state transmission ratio.

8. A control system for the vehicle with the continuously variable transmission as recited in claim 1 wherein said coefficient computing means is a means for computing said coefficient in accordance with a rate of change of a throttle opening degree.

9. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein said coefficient computing means comprises a current output power computing means for computing a current output power in accordance with the operating condition of the vehicle, and a steady state output power computing means for computing a steady state output power in accordance with the operating condition of the vehicle, and said steady state transmission ratio, and said coefficient computing means computes said coefficient in accordance with a relationship between said current output power and said steady state output power.

10. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein the shift speed determined in said shift speed determining means is a decreasing function with respect to said current transmission ratio and said output shaft revolution speed, and an increasing function with respect to said coefficient, and wherein said coefficient computing means comprises a current output power computing means for computing a current output power in accordance with the operating condition of the vehicle, and a steady state output power computing means for computing a steady state output power in accordance with the operating condition of the vehicle, and said steady state transmission ratio, and said coefficient computing means computes said coefficient in accordance with a relationship between said current output power and said steady state output power.

11. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein said coefficient computing means comprises a current driving force computing means for computing a current vehicle driving force in accordance with the operating condition of the vehicle, and a steady state driving force computing means for computing a steady state vehicle driving force in accordance with the operating condition of the vehicle, and said steady state transmission ratio, and said coefficient computing means computes said coefficient in accordance with a relationship between said current vehicle driving force and said steady state vehicle driving force.

12. In a vehicle having a continuously variable transmission between an engine and a drive axle, a control system for the vehicle equipped with the continuously variable transmission, said control system comprising:
- a steady state transmission ratio computing means for computing a steady state transmission ratio in accordance with an operating condition of the vehicle;
- a transmission ratio detecting means for detecting a current transmission ratio;
- an output shaft revolution speed detecting means for detecting an output shaft revolution speed of the transmission;
- a coefficient computing means for computing a coefficient determined by the operating condition of the vehicle;
- a shift speed determining means for determining a shift speed in shifting in accordance with at least said current transmission ratio, said output shaft revolution speed, and said coefficient; and
- a shift controlling means for controlling a shift element of the transmission in accordance with said shift speed so as approach to said steady state transmission ratio,
- wherein the shift speed determined in said shift speed determining means is a decreasing function with respect to said current transmission ratio and said output shaft revolution speed, and an increasing function with respect to said coefficient, and
- wherein said coefficient computing means comprises a current driving force computing means for computing a current vehicle driving force in accordance with the operating condition of the vehicle, and a steady state driving force computing means for computing a steady state vehicle driving force in accordance with the operating condition of the vehicle, and said steady state transmission ratio, and said coefficient computing means computes said coefficient in accordance with a relationship between said current vehicle driving force and said steady state vehicle driving force.

13. In a vehicle having a continuously variable transmission between an engine and a drive axle, a control system for the vehicle equipped with the continuously variable transmission, said control system comprising:
- a steady state transmission ratio computing means for computing a steady state transmission ratio in accordance with an operating condition of the vehicle;
- a transmission ratio detecting means for detecting a current transmission ratio;
- an output shaft revolution speed detecting means for detecting an output shaft revolution speed of the transmission;
- a coefficient computing means for computing a coefficient determined by the operating condition of the vehicle;
- a shift speed determining means for determining a shift speed in shifting in accordance with at least said current transmission ratio, said output shaft revolution speed, and said coefficient; and
- a shift controlling means for controlling a shift element of the transmission in accordance with said shift speed so as approach to said steady state transmission ratio,
- wherein said coefficient computing means is a means for computing said coefficient in accordance with a relationship between said current transmission ratio and said steady state transmission ratio, and
- wherein said relationship in said coefficient computing means is a difference between the steady state value and the current value.

14. In a vehicle having a continuously variable transmission between an engine and a drive axle, a control system for the vehicle equipped with the continuously variable transmission, said control system comprising:
- a steady state transmission ratio computing means for computing a steady state transmission ratio in accordance with an operating condition of the vehicle;
- a transmission ratio detecting means for detecting a current transmission ratio;
- an output shaft revolution speed detecting means for detecting an output shaft revolution speed of the transmission;
- a coefficient computing means for computing a coefficient determined by the operating condition of the vehicle;
- a shift speed determining means for determining a shift speed in shifting in accordance with at least said current transmission ratio, said output shaft revolution speed, and said coefficient; and
- a shift controlling means for controlling a shift element of the transmission in accordance with said shift speed so as approach to said steady state transmission ratio,
- wherein said coefficient computing means is a means for computing said coefficient in accordance with a relationship between said current transmission ratio and said steady state transmission ratio, and
- wherein said relationship in said coefficient computing means is a ratio between the steady state value and the current value.

15. In a vehicle having a continuously variable transmission between an engine and a drive axle, a control system for the vehicle equipped with the continuously variable transmission, said control system comprising:
- a steady state transmission ratio computing means for computing a steady state transmission ratio in accordance with an operating condition of the vehicle;
- a transmission ratio detecting means for detecting a current transmission ratio;
- an output shaft revolution speed detecting means for detecting an output shaft revolution speed of the transmission;
- a coefficient computing means for computing a coefficient determined by the operating condition of the vehicle;
- a shift speed determining means for determining a shift speed in shifting in accordance with at least said current transmission ratio, said output shaft revolution speed, and said coefficient; and
- a shift controlling means for controlling a shift element of the transmission in accordance with said shift speed so as approach to said steady state transmission ratio,
- wherein said coefficient computing means comprises a steady state output power computing means for computing a steady state output power in accordance with the operating condition of the vehicle, and said steady state transmission ratio, and said coefficient computing means computes said coefficient in accordance with a rate of change of said steady state output power.

16. In a vehicle having a continuously variable transmission between an engine and a drive axle, a control system for the vehicle equipped with the continuously variable transmission, said control system comprising:
- a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein the shift speed determined in said shift speed determining means is a decreasing function with respect to said current transmission ratio and said output shaft revolution speed, and an increasing function with respect to said coefficient, and wherein said coefficient computing means comprises a steady state output power computing means for computing a steady state output power in accordance with the operating condition of the vehicle, and said steady state transmission ratio, and said coefficient computing means computes said coefficient in accordance with a rate of change of said steady state output power.

17. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein said coefficient computing means comprises a steady state driving force computing means for computing a steady state vehicle driving force in accordance with the operating condition of the vehicle, and said steady state transmission ratio, and said coefficient computing means computes said coefficient in accordance with a rate of change of said steady state driving force.

18. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein the shift speed determined in said shift speed determining means is a decreasing function with respect to said current transmission ratio and said output shaft revolution speed, and an increasing function with respect to said coefficient, and wherein said coefficient computing means comprises a steady state driving force computing means for computing a steady state vehicle driving force in accordance with the operating condition of the vehicle, and said steady state transmission ratio, and said coefficient computing means computes said coefficient in accordance with a rate of change of said steady state driving force.

19. In a vehicle having a continuously variable transmission between an engine and a drive axle, a control method for the vehicle with the continuously variable transmission, said control method comprising the steps of:

computing a steady state transmission ratio in accordance with an operating condition of the vehicle, detecting a current transmission ratio, detecting an output shaft revolution speed of the transmission, computing a coefficient determined by the vehicle operating condition, determining a shift speed in accordance with at least said current transmission ratio, said output shaft revolution speed and said coefficient, and controlling a shift element of said transmission in accordance with said shift speed so as to approach to said steady state transmission ratio, wherein the method further comprises a step for determining a fraction whose numerator is equal to the coefficient, and whose denominator is proportional to said current transmission ratio and proportional to said output shaft revolution speed and for determining the shift speed in accordance with the fraction.

20. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein the shift speed determining means includes a means for determining a fraction whose numerator is equal to the coefficient, and whose denominator is proportional to said current transmission ratio and proportional to said output shaft revolution speed.

21. In a vehicle having a continuously variable transmission between an engine and a drive axle, a control system for the vehicle equipped with the continuously variable transmission, said control system comprising:

a steady state transmission ratio computing means for computing a steady state transmission ratio in accordance with an operating condition of the vehicle;

a transmission ratio detecting means for detecting a current transmission ratio;

an output shaft revolution speed detecting means for detecting an output shaft revolution speed of the transmission;

a coefficient computing means for computing a coefficient determined by the operating condition of the vehicle;

a shift speed determining means for determining a shift speed in shifting in accordance with at least said current transmission ratio, said output shaft revolution speed, and said coefficient; and a shift controlling means for controlling a shift element of the transmission in accordance with said shift speed so as approach to said steady state transmission ratio, wherein said coefficient computing means is a means for computing said coefficient in accordance with a relationship between said current transmission ratio and said steady state transmission ratio, and wherein said coefficient computing means is a means for determining the coefficient which is an increasing function of an absolute value of a difference between said current transmission ratio and said steady state transmission ratio and said steady state transmission ratio.

22. In a vehicle having a continuously variable transmission between an engine and a drive axle, a control system for the vehicle equipped with the continuously variable transmission, said control system comprising:

a steady state transmission ratio computing unit that calculates a steady state transmission ratio in accordance with an operating condition of the vehicle;

a transmission ratio detector that detects a current transmission ratio;

an output shaft revolution speed detector that detects an output shaft revolution speed of the transmission;

a coefficient computing unit that calculates a coefficient determined by the operating condition of the vehicle;

a shift speed determining unit that calculates a shift speed in shifting in accordance with at least said current transmission ratio, said output shaft revolution speed, and said coefficient; and a shift controller that controls a shift element of the transmission in accordance with said shift speed so as to approach said steady state transmission ratio, wherein the shift speed determining unit is connected with the transmission ratio detector unit, the output shaft revolution speed detector and the coefficient computing unit, and receives a signal representing the current transmission ratio from the transmission ratio detector, a signal representing the output shaft revolution speed from the output shaft revolution speed detector, and a signal representing the coefficient from the coefficient computing unit.

23. A control system for the vehicle with the continuously variable transmission as recited in claim 22, wherein said coefficient computing unit calculates said coefficient in accordance with a relationship between said current transmission ratio and said steady state transmission ratio.

24. A control system according to claim 23 wherein said coefficient computing unit calculates the coefficient as an increasing function of an absolute value of a difference between said current transmission ration and said steady state transmission ratio.

25. A control system as recited in claim 22 wherein said coefficient is calculated in accordance with a rate of change of said steady state transmission ratio.

26. A control system according to claim 22 wherein the shift speed determining unit also determines a fraction whose numerator is equal to the coefficient, and whose denominator is proportional to said current transmission ratio and proportional to said output shaft revolution speed.

27. In a vehicle having a continuously variable transmission between an engine and a drive axle, a control system for the vehicle equipped with the continuously variable transmission, said control system comprising:

a steady state transmission ratio computing unit that calculates a steady state transmission ratio in accordance with an operating condition of the vehicle;

a transmission ratio detector that detects a current transmission ratio;

an output shaft revolution speed detector that detects an output shaft revolution speed of the transmission;

a coefficient computing unit that calculates a coefficient determined by the operating condition of the vehicle;

a shift speed determining unit that calculates a shift speed in shifting in accordance with at least said current transmission ratio, said output shaft revolution speed, and said coefficient; and a shift controller that controls a shift element of the transmission in accordance with said shift speed so as to approach said steady state transmission ratio, wherein said coefficient computing unit calculates said coefficient in accordance with a relationship between said current transmission ratio and said steady state transmission ratio, and wherein said relationship is a difference between the steady state transmission ratio and the current transmission ratio.

28. In a vehicle having a continuously variable transmission between an engine and a drive axle, a control system for the vehicle equipped with the continuously variable transmission, said control system comprising:

a steady state transmission ratio computing unit that calculates a steady state transmission ratio in accordance with an operating condition of the vehicle;

a transmission ratio detector that detects a current transmission ratio;

an output shaft revolution speed detector that detects an output shaft revolution speed of the transmission;

a coefficient computing unit that calculates a coefficient determined by the operating condition of the vehicle;

a shift speed determining unit that calculates a shift speed in shifting in accordance with at least said current transmission ratio, said output shaft revolution speed, and said coefficient; and a shift controller that controls a shift element of the transmission in accordance with said shift speed so as to approach said steady state transmission ratio, wherein said coefficient computing unit calculates said coefficient in accordance with a relationship between said current transmission ratio and said steady state transmission ratio, and wherein said relationship is a ratio between the steady state transmission ratio and the current transmission ratio.

29. In a vehicle having a continuously variable transmission between an engine and a drive axle, a control system for the vehicle equipped with the continuously variable transmission, said control system comprising:

- a steady state transmission ratio computing unit that calculates a steady state transmission ratio in accordance with an operating condition of the vehicle;
- a transmission ratio detector that detects a current transmission ratio;
- an output shaft revolution speed detector that detects an output shaft revolution speed of the transmission;
- a coefficient computing unit that calculates a coefficient determined by the operating condition of the vehicle;
- a shift speed determining unit that calculates a shift speed in shifting in accordance with at least said current transmission ratio, said output shaft revolution speed, and said coefficient; and
- a shift controller that controls a shift element of the transmission in accordance with said shift speed so as to approach said steady state transmission ratio,
- wherein said coefficient computing unit includes a current output power computing unit that computes a current output power in accordance with the operating condition of the vehicle, and a steady state output power computing unit that computes a steady state output power in accordance with the operating condition of the vehicle, and said steady state transmission ratio, and said coefficient computing unit calculates said coefficient in accordance with a relationship between said current output power and said steady state output power.

30. In a vehicle having a continuously variable transmission between an engine and a drive axle, a control system for the vehicle equipped with the continuously variable transmission, said control system comprising:

- a steady state transmission ratio computing unit that calculates a steady state transmission ratio in accordance with an operating condition of the vehicle;
- a transmission ratio detector that detects a current transmission ratio;
- an output shaft revolution speed detector that detects an output shaft revolution speed of the transmission;
- a coefficient computing unit that calculates a coefficient determined by the operating condition of the vehicle;
- a shift speed determining unit that calculates a shift speed in shifting in accordance with at least said current transmission ratio, said output shaft revolution speed, and said coefficient; and
- a shift controller that controls a shift element of the transmission in accordance with said shift speed so as to approach said steady state transmission ratio,
- wherein said coefficient computing unit includes a current driving force computing unit that calculates a current vehicle driving force in accordance with the operating condition of the vehicle and a steady state driving force computing unit that calculates a steady state vehicle driving force in accordance with the operating condition of the vehicle, and said steady state transmission ratio, and said coefficient computing unit calculates said coefficient in accordance with a relationship between said current vehicle driving force and said steady state vehicle driving force.

31. In a vehicle having a continuously variable transmission between an engine and a drive axle, a control system for the vehicle equipped with the continuously variable transmission, said control system comprising:

- a steady state transmission ratio computing unit that calculates a steady state transmission ratio in accordance with an operating condition of the vehicle;
- a transmission ratio detector that detects a current transmission ratio;
- an output shaft revolution speed detector that detects an output shaft revolution speed of the transmission;
- a coefficient computing unit that calculates a coefficient determined by the operating condition of the vehicle;
- a shift speed determining unit that calculates a shift speed in shifting in accordance with at least said current transmission ratio, said output shaft revolution speed, and said coefficient; and
- a shift controller that controls a shift element of the transmission in accordance with said shift speed so as to approach said steady state transmission ratio,
- wherein said coefficient computing unit includes a steady state output power computing unit that computes a steady state output power in accordance with the operating condition of the vehicle, and said steady state transmission ratio, and said coefficient computing unit calculates said coefficient in accordance with a rate of change of said steady state output power.

32. In a vehicle having a continuously variable transmission between an engine and a drive axle, a control system for the vehicle equipped with the continuously variable transmission, said control system comprising:

- a steady state transmission ratio computing unit that calculates a steady state transmission ratio in accordance with an operating condition of the vehicle;
- a transmission ratio detector that detects a current transmission ratio;
- an output shaft revolution speed detector that detects an output shaft revolution speed of the transmission;
- a coefficient computing unit that calculates a coefficient determined by the operating condition of the vehicle;
- a shift speed determining unit that calculates a shift speed in shifting in accordance with at least said current transmission ratio, said output shaft revolution speed, and said coefficient; and
- a shift controller that controls a shift element of the transmission in accordance with said shift speed so as to approach said steady state transmission ratio,
- wherein said coefficient computing unit includes a steady state driving force computing unit that computes a steady state vehicle driving force in accordance with the operating condition of the vehicle, and said steady state transmission ratio, and said coefficient computing unit calculates said coefficient in accordance with a rate of change of said steady state driving force.

* * * * *